United States Patent
Paoli et al.

[15] 3,680,001
[45] July 25, 1972

[54] DYNAMIC AM CONTROL OF THE TRANSVERSE MODES OF A SELF-PULSING SEMICONDUCTOR LASER

[72] Inventors: Thomas Lee Paoli, Catham; Jose Ellis Ripper, North Plainfield, both of N.J.

[73] Assignee: Bell Telephone Laboratories, Incorporated, Murray Hill, N.J.

[22] Filed: May 13, 1971

[21] Appl. No.: 142,982

[52] U.S. Cl. .......................... 331/94.5, 250/199, 317/235
[51] Int. Cl. ........................................................ H01s 3/00
[58] Field of Search ............... 331/94.5; 332/7.51; 250/199; 317/235; 307/312

[56] References Cited

OTHER PUBLICATIONS

Paoli et al: "Frequency Pulling and Pulse Position Modulation of Pulsing CWGaAs Injection Lasers," App. Phys. Lett. Vol. 15, pp. 203–5, Oct. 1, 1969

Primary Examiner—Ronald L. Wibert
Assistant Examiner—Edward S. Bauer
Attorney—R. J. Guenther and Arthur J. Torsiglieri

[57] ABSTRACT

A semiconductor laser, at appropriate values of current above threshold, enters a nonlinear regime characterized by (1) a continuous region in which the output radiation self-pulses simultaneously in two competing transverse modes and/or (2) a bistable region in which the output radiation self-pulses in either of two noncompeting transverse modes, but not both. In one embodiment the laser is current biased in one of these regions and is switched between different transverse modes by amplitude modulating the injection current.

14 Claims, 2 Drawing Figures

DYNAMIC AM CONTROL OF THE TRANSVERSE MODES OF A SELF-PULSING SEMICONDUCTOR LASER

BACKGROUND OF THE INVENTION

This invention relates to apparatus and methods for modulating lasers and, more particularly, to apparatus and methods for the control of the transverse modes of a self-pulsing semiconductor laser.

As a result of recent developments in the semiconductor laser art, several classifications of such lasers have been defined. Early semiconductor laser structures, now termed homostructure lasers, comprised a single body of semiconductor material of a uniform bandgap throughout and in which a p-n junction was formed typically by diffusion of p-type impurities into an n-type substrate. Due to severe problems of overheating, homostructure lasers were limited at room temperature to pulsed operation, continuous wave operation being achieved only at cryogenic temperatures. More recently, I. Hayashi and M. B. Panish have successfully achieved continuous wave operation at room temperature in a new form of semiconductor laser termed a double heterostructure (DH), as reported in Applied Physics Letters, 17, 109 (Aug. 1, 1970). The double heterostructure comprises a narrow bandgap active region sandwiched between a pair of wider bandgap regions. The interfaces between the narrow and wide bandgap regions form heteroboundaries which effectively confine injected electrons and optical photons to the active region with the result that lower thresholds, as well as a lower temperature dependence of the threshold, are achieved. The double heterostructure is described in greater detail in copending application Ser. No. 33,705 (I. Hayashi Case 4) filed on May 1, 1970 and assigned to applicants' assignee. Also described in that application is a single heterostructure (SH) laser in which a single heteroboundary is located at a distance from the p-n function less than the diffusion length of injected carriers.

In a paper entitled "Coupled Longitudinal Mode Pulsing in Semiconductor Lasers," Phys. Rev. Letters, 22, 1085 (May 26, 1969) we reported that GaAs homojunction injection lasers operating continuously at liquid nitrogen temperatures (77° K), at suitable values of temperature and injection current, exhibit a self-induced or spontaneously pulsing effect; that is, they produce a train of light pulses at microwave repetition rates. Self-induced pulsing, also termed second order mode locking, in which the pulsing frequency (i.e., repetition rate) is equal to the difference of a longitudinal mode frequency and a neighboring combination tone, should be distinguished from conventional mode locking where the pulsing frequency is equal to the difference of two neighboring mode frequencies.

The self-induced pulsing is attributed to coupling among the longitudinal modes of the laser and the high dispersion of semiconductor materials. Thus, theory indicates that similar pulsing behavior is present in semiconductor lasers made of materials other than GaAs and/or using pumping mechanisms other than minority carrier injection through a p-n junction.

SUMMARY OF THE INVENTION

We have demonstrated that second order mode locking, and the resulting self-pulsing of the output light intensity, occurs in double heterostructure injection lasers operating continuously at room temperature. In comparison with our results for homostructure lasers operating at cryogenic temperatures, self-induced pulsing in double heterostructure lasers occurs at a lower microwave repetition rate and over a greater range of current and temperature. These differences are attributed to the lower dispersion and lower Q of the longitudinal cavity modes due to the increased operating temperature.

We have discovered, in addition, that at appropriate injection current levels above threshold the double heterostructure enters a nonlinear regime characterized by (1) a continuous region in which the output radiation self-pulses simultaneously in two competing transverse modes; i.e., the modes self-pulse at a single pulsing frequency intermediate the separate frequencies at which the modes would self-pulse if they oscillated independent of one another, and/or (2) a bistable region in which the output radiation self-pulses in either of two non-competing transverse modes, but not both, each of which corresponds to a different self-pulsing frequency. It is expected, furthermore, that both homostructure and SH lasers will exhibit similar nonlinear regimes.

In accordance with an illustrative embodiment of our invention such a laser, current biased in either of these regions, is switched between different transverse modes by amplitude modulating the injection current. In the continuous region the modes switch gradually from one distribution to another whereas in the bistable region the modes switch abruptly.

In our copending application Ser. No. 142,983 (Paoli-Ripper Case 9-10) filed concurrently herewith, we describe a frequency modulation technique for control of the transverse modes of a self-pulsing semiconductor laser.

BRIEF DESCRIPTION OF THE DRAWINGS

The invention, together with its various features and advantages, can be easily understood from the following more detailed description taken in conjunction with the accompanying drawings in which.

DETAILED DESCRIPTION

For the purposes of illustration only, the following description is limited to DH injection lasers, it being understood, however, that the principles of our invention apply equally as well to semiconductor lasers in general and to pumping other than by injection of minority carriers through a junction.

Figure 1:
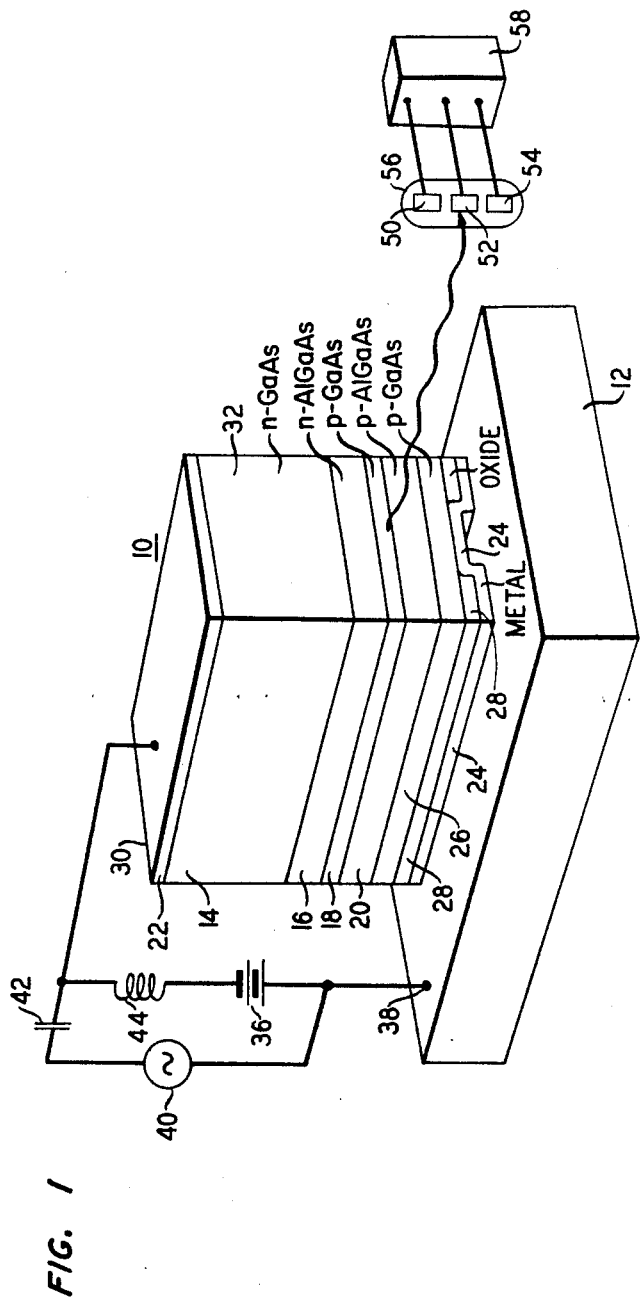
FIG. 1 is a pictorial view of an illustrative embodiment of our invention utilizing a DH laser.

Turning now to FIG. 1, there is shown in accordance with an illustrative embodiment of our invention a double heterostructure injection laser 10 mounted, as by thermal bonding or other well known techniques, on a heat sink 12 typically made of diamond, copper or other suitable high thermal conductivity material. The double heterostructure laser 10 is a multilayered structure in which the various layers are typically grown using a liquid phase epitaxy technique described in copending application Ser. No. 28,365 (Panish-Sumski Case 5-5) filed on Apr. 14, 1970 and assigned to applicants' assignee and now abandoned. Alternatively, however, these layers may also be epitaxially grown by a molecular beam epitaxy technique as described in copending applications Ser. No. 787,470 (J. R. Arthur, Jr. Case 3) filed on Dec. 27, 1968 now U.S. Pat. No. 3,615,931 and Ser. No. 127,926 (A. Y. Cho Case 2) filed on Mar. 25, 1971, both of which are assigned to applicants' assignee. More particularly, the double heterostructure illustratively comprises an n-type GaAs substrate 14 upon which are sequentially grown the following epitaxial layers: a wide bandgap, n-type GaAs layer 16 about 1-3 microns thick, a narrow bandgap, p-type GaAs layer 18 (the active region) about 1.0 micron thick, and a wide bandgap, p-type AlGaAs layer 20 about 1-3 microns thick. The active region may also be AlGaAs provided the Al content is adjusted so that the bandgap of the active region is less than that of both layers 16 and 20. For simplicity, double heterostructures with either GaAs or AlGaAs active regions will hereinafter be termed "AlGaAs double heterostructures."

The contacts to the laser structure are formed by metal layer 22 deposited on the substrate 14 and by a metallic stripe 24 which makes electrical contact with the structure through a shallow (e.g. 0.2 micron) p+-GaAs layer 26 diffused into the p-type AlGaAs layer 20. The stripe contact 24 is typically fabricated by well known photolithographic techniques involving the deposition of a silicon dioxide layer 28 and the subsequent etching of an elongated channel therein to define the stripe. Alternatively, the oxide layer may be omitted and instead the regions which would be covered by such an oxide may be bombarded with high energy protons to produce high resistivity regions in the layers 26 and 20, a technique which we attribute to J. C. Dyment and L. A. D'Asaro.

As is well known in the art, the opposing end faces 30 and 32 of the double heterostructure are typically cleaved or polished optically flat to form a cavity resonator for sustaining stimulated recombination radiation generated in the active region 18 when the p-n junction 34 is forward-biased.

The forward bias is typically provided by a dc power source, illustratively shown as battery 36, connected across contacts 22 and 24. As shown in FIG. 1, however, battery contact 38 is connected to a metallized coating (e.g., tin, not shown) on heat sink 12 where the heat sink is made of an electrical insulator such as diamond. Of course, the use of an electrically conductive heat sink such as copper would obviate the need for such a coating.

For reasons which will become apparent hereinafter, an information source 40 is also connected across the double heterostructure 10 in order to amplitude modulate the injection current in accordance with information to be transmitted. In addition, in order to isolate the source and battery from one another, a blocking capacitor 42 is connected in series with the source 40 and an inductor is connected in series with the battery 36.

Diodes fabricated as above operate continuously at room temperature at wavelengths ranging from about 7500 to 9000 Angstroms. Continuous wave thresholds are typically about 0.3 A. (6,000 A/cm$^2$) for a lasing stripe contact 13 microns wide by 400 microns long, the diode width being about 80 microns, and its depth, including an n-type GaAs substrate 14 being about 6-7 mils.

Figure 2:
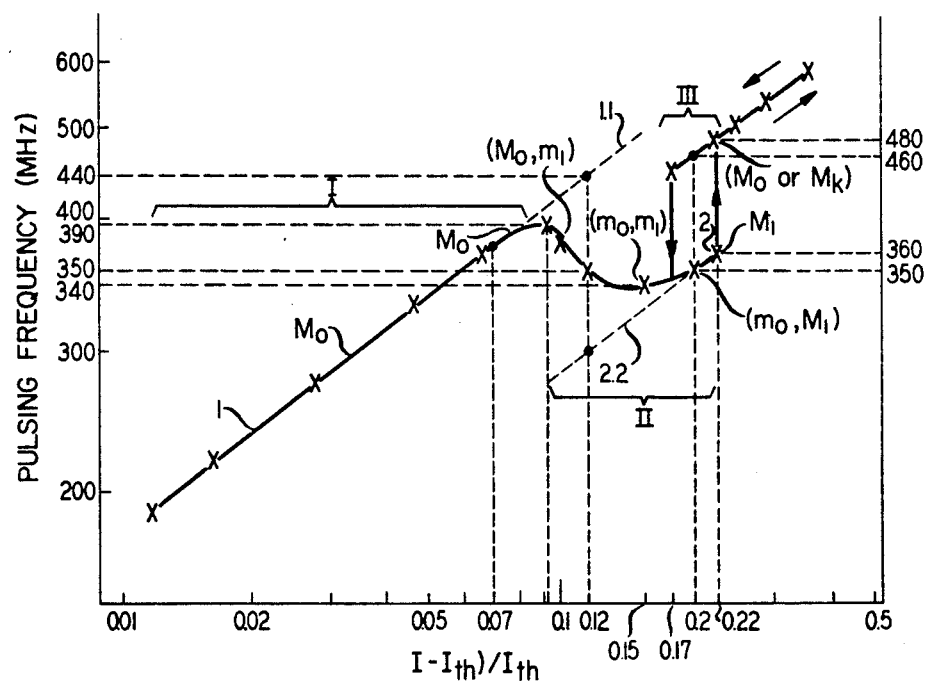
FIG. 2 is a log-log graph of self-pulsing frequency versus threshold current for a double heterostructure injection laser in accordance with an illustrative embodiment of our invention.

Without the control source 40 being connected in the circuit shown in FIG. 1, we have observed the optical spectrum of the laser output with a grating spectrometer equipped with a rotating diffraction plate. Simultaneously, the time variation of the laser intensity was monitored with a fast photodiode coupled into a microwave spectrum analyzer, as described in our article in Phys. Rev. Letters, 22, 1085 (1969) supra. We observed that the modes of the double heterostructure laser can be locked at injection levels as low as 2-3 percent above threshold as shown in FIG. 2, a log-log graph of pulsing frequency versus injection above threshold. In contrast, self-induced mode locking in homostructure lasers typically does not occur for injection levels less than about 10 percent above threshold. In addition, locking is maintained over most of the current range in which the double heterostructure lasers operate continuously. The wider range of locking, as mentioned previously, is believed to be due to the lower Q of the laser modes at room temperature. The lower Q facilitates the slight adjustment of the modal frequencies required to maintain the mode-locking as the natural resonance frequency of the laser varies with changes in the injection current. Although not shown in FIG. 1, the frequency of the self-pulsing in double heterostructure lasers is lower than that of a low temperature (e.g., 80° K) homostructure laser of the same length operating at the same level above threshold. The reduced pulsing rate of the double heterostructure laser is believed to be due to the combination of the lower dispersion of the laser material at room temperature and the longer spontaneous emission lifetime in the double heterostructure diodes. The longer lifetime reduces the frequency of the intrinsic laser resonance at a given level above threshold while the lower dispersion allows the self-excitation of this resonance (through the internal beating of three longitudinal modes) to occur at low injection levels.

When self-pulsing, the output radiation oscillates in a plurality of locked longitudinal modes and in a typical transverse mode $(l,n)$ where $l$ and $n$ are the transverse modes numbers for modes respectively perpendicular to and parallel to the junction plane. Thus, the output may oscillate in a fundamental transverse mode, e.g., $(0,n_o)$, hereinafter designated $M_o$ when that mode oscillates alone or is dominant, and hereinafter designated $m_o$ when that mode is not dominant. A similar designation is used for other modes, i.e., $M_1$ or $m_1$ for a first order mode $(1,n_1)$, where $n_o$ and $n_1$ can be made equal utilizing the aforementioned stripe contact laser geometry.

As shown in FIG. 2, at current levels below approximately 9-10 percent above threshold (region I), the pulsing frequency is approximately proportional to $$[(I-I_{th})/I_{th}]^n$$

with $n \cong 0.5$ and the output radiation oscillates in a single transverse mode, e.g., the fundamental mode $M_o$.

In contrast with region I, for injection levels greater than approximately 10 percent above threshold, the device enters a nonlinear regime characterized by (1) a continuous region II in which a pair of competing transverse modes exist simultaneously at a pulsing frequency intermediate the frequencies at which the modes would self-pulse if they oscillated independent of one another, and/or (2) a bistable region III in which either of two transverse modes, but not both simultaneously, may oscillate noncompetitively at different pulsing frequencies. Both types of departure from the low current level behavior of region I are associated with a change in the set of locked modes from one family to another family with a different spatial distribution perpendicular to the junction plane.

These regions are shown in FIG. 2 where the numerical values are provided by way of illustration only and should not be construed as limitations on the scope of our invention. Thus, continuous region II begins at about nine percent above threshold where the pulsing frequency first departs continuously from the straight line of region I and extends to currents of about 22 percent above threshold. At lower levels of current in region II (e.g., 10 percent) both fundamental and first order transverse modes coexist, with the former dominant. This situation is designated $[M_o,m_1]$. As current is increased, the first order mode gains in strength until at about 15 percent above threshold both coexist and neither is dominant, i.e., $[m_o,m_1]$. As current is further increased to about 20 percent above threshold the first order mode becomes dominant over the fundamental, i.e., $[m_o,M_1]$. Finally, at about 22 percent $M_1$ oscillates to the exclusion of $m_o$.

Throughout region II, excluding the extreme point at 22 percent above threshold, frequency "pulling" of the competing modes produces self pulsing at an intermediate pulsing frequency, as mentioned previously. For example, at a current of about 12 percent above threshold, the competing modes pulse at frequency of about 350 MHz. By extending line 1 as dashed line 1.1 we determine a pulsing frequency of 440 MHz at 12 percent above threshold which corresponds approximately to the pulsing frequency that transverse mode $M_o$ would have if it were oscillating alone. Similarly, by extending line 2.2 from data point 2 parallel to line 1, we determine a pulsing frequency of 300 MHz which corresponds approximately to the pulsing frequency transverse mode $M_1$ would have if it were oscillating alone.

As current is increased, however, beyond a first critical level of about 22 percent above threshold, the device enters region III, i.e., oscillation abruptly switches from a state in which $M_1$ oscillates at a pulsing frequency of about 360 MHz to a state $M_o$ (or $M_k$, some mode other than $M_1$) at a pulsing frequency of about 480 MHz. Additional increases in current merely increase the pulsing frequency without changing the transverse mode pattern. However, as current is now decreased a hysteresis effect occurs, i.e., the laser remains locked in transverse mode $M_o$ (or $M_3$) below the first critical level (22 percent) until a second critical current level at about 17 percent above threshold is reached whereupon the laser switches back to oscillation in mode $[m_o,m_1]$.

While the above-described double heterostructure laser exhibited both a continuous transition (region II) and a bistable transition (region III), it is possible, depending upon the precise fabrication, that the diode may exhibit only a bistable or a continuous transition rather than both.

Utilizing the aforementioned characteristics of self-pulsing double heterostructure lasers, we propose to control the transverse modes of such a laser by amplitude modulating its injection current with an information signal generated by source 40.

In an illustrative embodiment, the battery 36 biases the laser at a current in continuous region II, e.g., at a point 15 percent above threshold where modal families $[m_o, m_1]$ coexist and self-pulse at a frequency of about 340 MHz. Source 40 amplitude modulates the injection current around this bias point illustratively causing the current to swing between a point seven percent above threshold, where mode $M_o$ self-pulses at about 360 MHz, to a point 21 percent above threshold, where mode $M_1$ also self-pulses at about 360 MHz. Care should be exercised that the current does not exceed the first critical value at 22 percent above threshold, otherwise the device will switch into the bistable region II, as previously described. Note that in this embodiment the modes change gradually from one family to another as the current amplitude changes. In some communications systems, however, it might be desirable that the modes switch abruptly between discrete states rather than continuously between coupled states.

Such discrete states may be obtained by biasing the double heterostructure at a current in region III. Thus, consider a bias point at an injection current 21 percent above threshold which corresponds to two discrete states: transverse mode $M_1$ self-pulsing at about 355 MHz and transverse mode $M_o$ (or $M_k$, $k \geq 2$) self-pulsing at about 470 MHz. Source 40 is made to amplitude modulate the injection current above the first critical current at about 22 percent above threshold to below the second critical current at about 17 percent above threshold. Consequently, the output switches between modal families $M_1$ and $M_o$. This embodiment advantageously requires only about a five percent current swing whereas the latter embodiment typically utilizes about a 14 percent swing. It is expected, therefore, that modulation in the bistable region III can be accomplished at faster rates and with less power consumption.

These forms of transverse mode switching in the laser output can readily be employed in an optical communications system in which, for example, each of the separate and distinct transverse modes represent one of the binary states for the transmission of intelligence from information source 40. Since these states are represented by different spatial distributions of energy in the output, an appropriate detector typically includes, as shown in FIG. 1, spatially separated photodiodes 50, 52, and 54 mounted on an appropriate holder 56. Illustratively, the photodiodes are silicon avalanche photodiodes coupled to a utilization device 58. Diodes 50 and 54 are spatially separated vertically for the detection of energy in the first order mode $(1, n_1)$ perpendicular to the junction plane whereas photodiode 52 is disposed along the resonator axis for the detection of energy in the fundamental transverse mode $(0, n_o)$ perpendicular to the junction plane. Of course, one skilled in the art could readily adapt the detector with other spatial arrangements of diodes to detect other transverse mode distributions or with other detectors such as, for example, a plurality of photomultipliers having S1 surfaces which are advantageously sensitive in the output wavelength range (7500–9000 Angstroms) of GaAs-AlGaAs diodes.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. A method of controlling the transverse mode distribution of a semiconductor laser comprising the steps of:

applying to said laser pumping energy effective to induce in the optical output thereof self-pulsing in a nonlinear regime in which different transverse mode distributions may exist at different pulsing frequencies; and amplitude modulating said pumping energy so that the self-pulsing output of said laser changes from one transverse mode distribution to another in accordance with information to be transmitted.

2. The method of claim 1 wherein said pumping energy induces self-pulsing in a bistable region of said nonlinear regime in which either of said transverse mode distributions may exist separately, but not both simultaneously, and said pumping energy is modulated from a point above a first critical level to a point below a second critical level so that said output switches abruptly between the said transverse mode distributions.

3. The method of claim 1 wherein said pumping energy induces self-pulsing in a continuous region of said nonlinear regime in which both of said transverse mode distributions exist simultaneously at a pulsing frequency intermediate the pulsing frequencies that said distributions would have if each were oscillating independent of the other.

4. The method of claim 1 wherein said laser comprises a p-n junction laser.

5. The method of claim 4 wherein said laser is switched between a first transverse mode distribution perpendicular to the plane of the junction of said laser and a second transverse mode distribution perpendicular to the plane junction of said laser.

6. The method of claim 4 wherein said laser comprises a double heterostructure junction laser.

7. The method of claim 6 wherein said laser comprises an AlGaAs double heterostructure junction laser and said pumping energy is provided by forward bias direct current.

8. Optical apparatus comprising:
   a semiconductor laser,
   pump means for applying pumping energy to said laser effective to induce therein self-pulsing in a nonlinear regime in which different transverse mode distributions may exist at different pulsing frequencies, and
   modulation means for amplitude modulating said pumping energy so that the self-pulsing output of said laser changes from one transverse mode distribution to another in accordance with information to be transmitted.

9. The apparatus of claim 8 wherein said pump means induces self-pulsing in a bistable region of said nonlinear regime in which either of said transverse mode distributions may exist separately, but not both simultaneously, and said modulation means modulates the amplitude of said pump energy from a point above a first critical level to a point below a second critical level so that said output switches abruptly between the said transverse mode distributions.

10. The apparatus of claim 8 wherein said pump means induces self-pulsing in a continuous region of said nonlinear regime in which both of said transverse mode distributions exist simultaneously at a pulsing frequency intermediate the pulsing frequencies that said distributions would have if each were oscillating independent of the other.

11. The apparatus of claim 8 wherein said laser comprises a p-n junction laser.

12. The apparatus of claim 11 wherein said laser is switched between a first transverse mode distribution perpendicular to the plane of the junction of said laser and a second transverse mode distribution perpendicular to the plane junction of said laser.

13. The apparatus of claim 11 wherein said laser comprises a double heterostructure junction laser.

14. The apparatus of claim 13 wherein said laser comprises an AlGaAs double heterostructure junction laser and said pumping energy is provided by forward bias direct current.

* * * * *